UNITED STATES PATENT OFFICE.

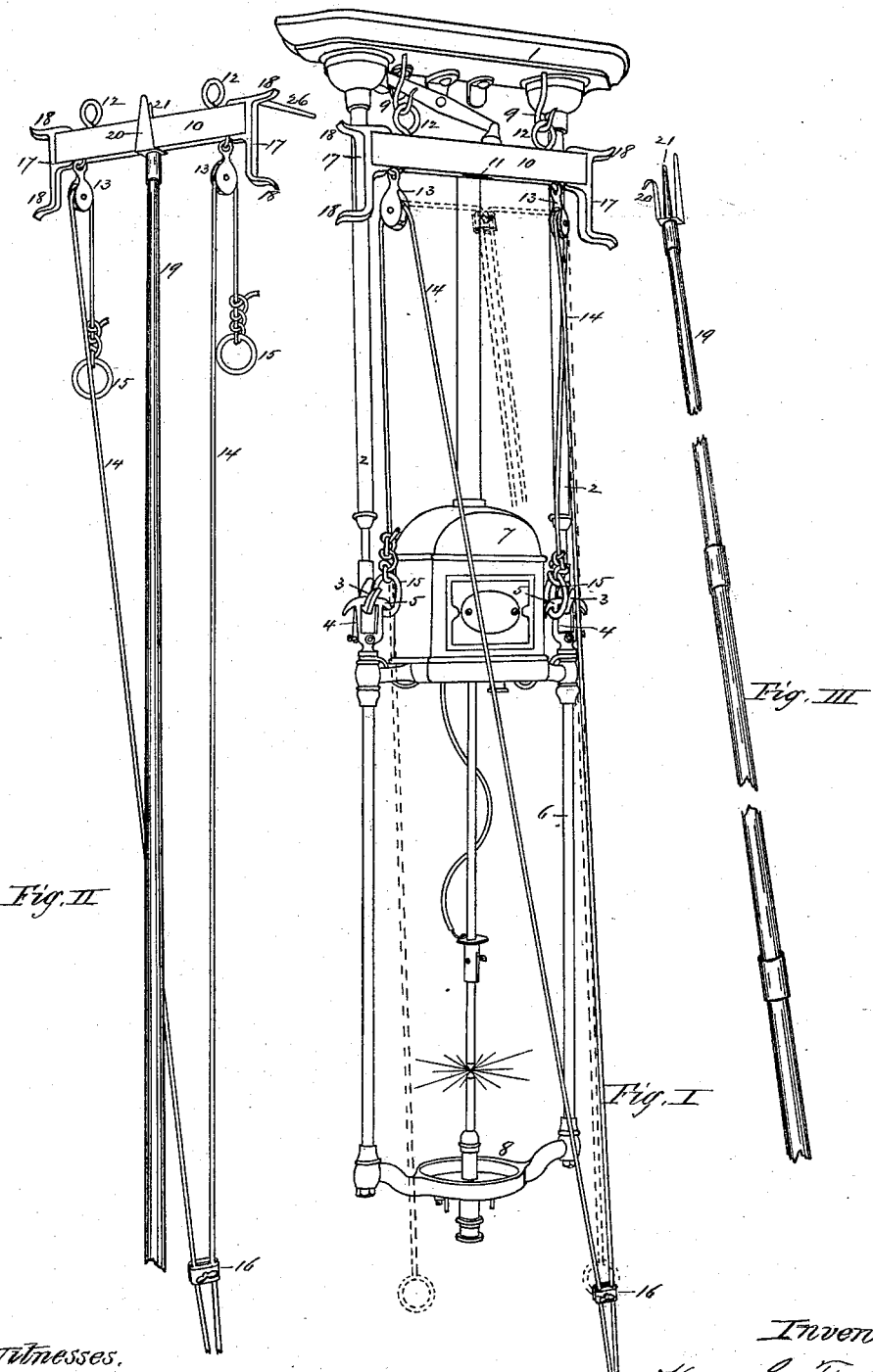

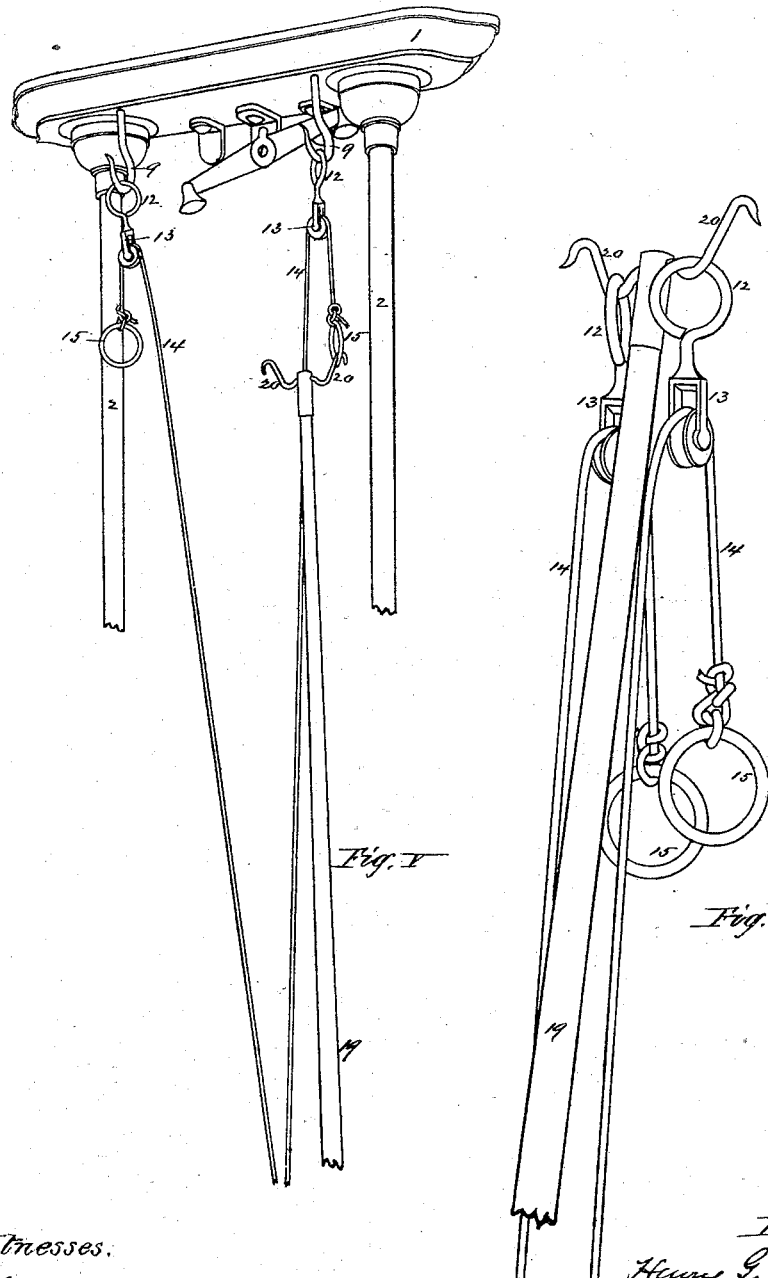

HENRY G. FISKE, OF SPRINGFIELD, MASSACHUSETTS.

APPARATUS FOR HANGING AND UNHANGING ELECTRIC LAMPS.

SPECIFICATION forming part of Letters Patent No. 262,941, dated August 22, 1882.

Application filed April 22, 1882. (No model.)

*To all whom it may concern:*

Be it known that I, HENRY G. FISKE, of Springfield, in the county of Hampden and State of Massachusetts, have invented a new and useful improvement in apparatus for hanging electric lamps and removing them from their place of suspension, of which the following is a specification and description.

The object of my invention is to furnish a means of easily and quickly removing electric lamps from their place, when suspended, for the purpose of repair or of renewing a carbon, and of replacing the lamp in its suspended position again; and I accomplish this by the means substantially as hereinafter set forth, and illustrated in the accompanying drawings, in which—

Figure I is a perspective view of an electric lamp suspended in place, and showing one modification of my apparatus as applied in removing the lamp from its place of suspension or placing it in that suspended position. Fig. II is a perspective view of one modification of the apparatus without the lamp. Fig. III is a perspective view of the rod, showing it as jointed, to be more easily and conveniently carried. Fig. IV is a perspective view of the pole with the suspending-eyes, pulley-blocks, and cord as secured on the pole and used without a reel-bar; and Fig. V is another perspective view of the pole as used in the operation of attaching the eyes to the suspending-hooks and the cord-rings to the lamp in taking the latter down from its suspended position.

In the drawings, 2 represents the side rods, which, together with the piece, as 1, represents the fixed frame from which any ordinary electric lamp is hung, the two side rods, as 6, and the carbon-cup 8, attached to their lower ends, together with the case, as 7, containing the carbon-moving mechanism, the whole representing an electric lamp of any ordinary construction.

I provide the lower end of each rod, as 2, with a hook, as 3, and I also secure two hooks, as 9, in the upper part, as 1, of the fixed frame, and upon the upper end of each lamp-rod, as 6, is made a loop, as 4, with a hooked projection, as 5, on one or both edges, as shown clearly in Fig. I.

If it is desired to use a reel upon which to wind the cord, a bar, as 10, preferably of wood, is provided with two eyes, as 12, at the same distance apart as are the hooks 9 in the piece 1, so that these eyes may be readily placed over the said hooks 9 and the bar 10 be suspended therefrom. Two pulley-blocks, as 13, are suspended from this bar 10, over which pass two cords, as 14, with a ring or hook, as 15, attached to the end of each cord, the latter being of any desired length, according to the height which it is desired to hang the lamp; and a vertical hole is made through said bar 10 about midway its length, as at 11, through or into which the end, as 21, of a pole, 19, may be inserted, this end of the pole being provided with side hooks, as 20, as shown in Fig. III. To each end of this bar 10 may be secured a metallic piece, as 17, having a horn, as 18, at each end, and upon one of these pieces 17 may be made a projecting guide, as 19, the bar 10 and its end pieces, 17, serving as a reel upon which to wind the cords 14 in carrying the apparatus from place to place.

If it is not desired to use a reel upon which to wind the cord in carrying it from place to place, I dispense with the bar, as 10, and use merely the two eyes, as 12, each having a pulley-block, as 13, below, with a pulley pivoted therein, and the cord, as 14, passing through the block and over the pulley, as shown clearly in Fig. IV.

When it is desired to unhang a lamp or remove it from its suspended position the cord is unwound from the reel or bar, and a projection, as 21, made on the end of the pole 19, (shown in Fig. III,) is inserted in the hole 11 in said bar, with the latter between the hooks 20, and the bar is raised and the eyes 12 placed over and upon the hooks 9, and this will be more easily and quickly done if, in raising the bar 10, the projecting guide-piece, as 26, is placed against the rod 2, and if this guide-piece is held against said rod while raising the bar the eyes in the latter will be guided directly to their position on the hooks. When the bar is thus suspended on the hooks, a clamp, as 16, which may consist of two flat disks of metal or other suitable material secured together by a thumb-screw, is firmly secured to the two cords 14 at about the distance from the pulley-blocks which it is desired to lower the lamp, firmly securing the cords together. The small projection on the end of the pole is then withdrawn from the hole 11 in the bar or reel, and, with the hook, as 20, on the end of the pole, each ring, as 15, is drawn down and placed under the projecting hook, as 5, at the upper end of the rod 6. The operator then draws down on the cords, raising the loops 4 out of the hooks 3, and when disengaged therefrom the whole lamp is lowered until the clamp, as 16, passes up to a position between the pulleys 13, as shown in dotted lines in Fig. I, and the lamp will then have been lowered to a position as indicated by the rings and cords in dotted lines in Fig. I, where the lamp will remain suspended in front of the operator while being repaired or supplied with a new carbon. In this operation the clamp, as 16, stops the downward movement of the lamp at a point according to the distance from the pulleys at which the clamp is secured to the cords and holds it there.

If, in taking the lamp down, the operator stands away from the lamp, so that the cords and bar 10 are drawn away from the lamp a little, the loops 4 will be more readily disengaged from the hooks 3.

When it is desired to hang the lamp again the cords are drawn down, the operator standing more beneath the lamp, and when raised sufficiently he may press the cords, if necessary, against the upper portion of the lamp until the loops 4 are in a proper position above the hooks 3, and then lowering the lamp, the loops will drop into position in the hooks. The rings, as 15, are then unfastened from the projecting hooks, as 5, by the hook, as 20, on the pole, the rings drawn up into place at the pulleys, and the end of the pole inserted in the hole 11 of the bar 10, the latter unhooked from the hooks 9 in the fixed frame of the lamp, and the bar taken down.

In going from one lamp to another the cords 14 may be wound on the bar 10 from end to end between the horns, as 18, the pole disjointed, and the whole apparatus made portable and easily carried.

The cord-pulleys may be suspended from or attached to the bar, as 10, in any convenient manner so as to operate freely, and preferably so that they may move laterally from side to side, as in the ordinary pulley-block.

Instead of the clamp, as 16, to secure the cords 14 together, the latter may be knotted or tied together at the desired point and operated in the same way.

In using the modification shown in Fig. IV, when it is desired to unhang a lamp the eyes, as 12, are placed one upon each hook, as 20, on the pole, as shown in Fig. IV, and then raised and hung one upon each hook, as 9, as shown clearly in Fig. V, and the cord-rings, as 15, are then pulled down and secured to the projections, as 5, on the loops, as 4, as before.

Whenever in this apparatus a hook-and-eye or loop fastening is used to secure two parts together, it is evident that the loop or the eye and the hook may be reversed in their relative position with each other without departing in the least from the principle of operation.

Having thus described my invention, what I claim as new is—

1. In an apparatus for hanging electric lamps, a portable bar provided with hook fastenings or eyes adapted to be suspended upon and in combination with stationary pendent hooks above the lamp, suspended pulleys attached to said bar, and cords to run over said pulleys, and provided with rings or similar fastenings, whereby an electric lamp provided with suspending-hook attachments may be removed from or hung upon its fixed frame, substantially as described.

2. In an apparatus for hanging electric lamps, open hooks made on the lower end of the frame, in combination with loops provided with hook-projections on the lamp, adapted to receive and engage with fastenings secured upon cords running over pulleys suspended at a point above the lamp, substantially as described.

3. In an apparatus for hanging electric lamps, a portable bar provided at each end with horns for reeling a cord thereon, and having hook-fastenings to adapt it to be suspended upon and in combination with stationary pendent hooks above the lamp, suspended pulleys attached to said bar, and operating-cords to run over said pulleys, and provided with rings or fastenings adapted to engage with hook-projections on the lamp, substantially as described.

4. In an apparatus for hanging electric lamps, the combination of a bar adapted to be suspended above the lamp, pendent pulleys secured to said bar, cords provided with rings or fastenings to hold the lamp, and a clamp to secure the cords together at any desired point distant from the pendent pulleys, substantially as described.

5. In an apparatus for hanging electric lamps, the combination of a bar provided with hook fastenings or eyes and adapted to be suspended above the lamp, and provided with pendent pulleys and a socket or hole, and a rod whose end is adapted to be inserted into the hole or socket in said bar, and a guide-hook on said pole, whereby said bar is raised to its position above the lamp and the cord-fastenings attached to and detached from the lamp, to remove the latter from or replace it in its suspended position, substantially as described.

6. In an apparatus for hanging electric lamps, two hooks pendent above the lamp, in combination with two eyes, each provided with a pulley-block and a pulley pivoted therein, a cord with a ring attached to each end, two pendent hooked rods, a lamp having loop or hook fastenings adapted to engage with said pendent hooked rods, and a hooked pole, whereby said lamp may be placed in its suspended position or removed therefrom, substantially as described.

HENRY G. FISKE.

Witnesses:
T. A. CURTIS,
CHAS. H. WOOD.